United States Patent
Flanigan

(10) Patent No.: US 7,147,182 B1
(45) Date of Patent: Dec. 12, 2006

(54) GAS-POWERED TIP-JET-DRIVEN TILT-ROTOR COMPOUND VTOL AIRCRAFT

(76) Inventor: Kenneth Warren Flanigan, 12385 6th St., 521, Yucaipa, CA (US) 92399

( * ) Notice: Subject to any disclaimer, the term of this patent is extended or adjusted under 35 U.S.C. 154(b) by 0 days.

(21) Appl. No.: 11/062,536

(22) Filed: Feb. 22, 2005

Related U.S. Application Data

(60) Provisional application No. 60/547,025, filed on Feb. 23, 2004.

(51) Int. Cl.
*B64C 27/22* (2006.01)
(52) U.S. Cl. .............................. 244/6; 244/7 R; 416/24
(58) Field of Classification Search ................... 244/6, 244/7 R, 7 A, 17.11, 17.13; 416/21, 20 R, 416/22, 23, 24
See application file for complete search history.

(56) References Cited

U.S. PATENT DOCUMENTS 5,984,635 A * 11/1999 Keller ...................... 416/20 A
6,530,542 B1 * 3/2003 Toulmay ................. 244/17.13

OTHER PUBLICATIONS

Dwayne A. Day, V/STOL Technology and Aircraft, U.S. Centennial of Flight Commission, http://www.centennialofflight.gov/essay/Evolution_of_Technology/VSTOL_aircraft/Tech30.htm.

* cited by examiner

*Primary Examiner*—Timothy D. Collins

(57) ABSTRACT

A tilt-rotor compound VTOL aircraft has a multiple-flow thrust generator(s) comprising a gas-powered tip-jet driven rotor(s) having a thrust-augmentation ratio of at least two; that tilts about the aircraft's pitch axis wherein the rotor's plane of rotation is substantially horizontal for VTOL operations and the rotor's plane of rotation is substantially vertical forward flight operations. A relatively small fixed-wing sustains the aircraft during forward flight. Compressed exhaust gas from the fan-jet engine(s) is ducted to a manifold having valves which control power to the multiple-flow thrust generator(s) and to the jet exhaust nozzle(s) as supplemental thrust for forward propulsion and yaw control. The manifold also serves to distribute compressed gas to the dead engine side of the aircraft in the event of a dead engine emergency, and to reaction jets for attitude control during VTOL operations. Thus this tilt-rotor aircraft is more efficient, faster, immensely lighter, less complex and less expensive to purchase and maintain than its shaft-driven counterparts.

12 Claims, 11 Drawing Sheets

US 7,147,182 B1

GAS-POWERED TIP-JET-DRIVEN TILT-ROTOR COMPOUND VTOL AIRCRAFT

CROSS-REFERENCE TO RELATED APPLICATION

CLAIM OF PRIORITY

This application claims the benefit of Provisional Application Ser. Nos. 60/547,025, filed 2004, Feb. 23 by the present inventor.

BACKGROUND OF INVENTION—FIELD OF INVENTION

This invention relates to tilt-rotor compound VTOL aircraft that utilize compressed gas driven tilt-rotors.

BACKGROUND OF INVENTION

In around the year 100 BC, Hero of Alexandria discovered the reaction engine with his aeolipile experiment. Then the Wright brothers introduced powered flight in 1903, and in 1910 Henri Marie Coanda married the two together to fly the first jet-propelled airplane. In 1955 the Bell XV-3, the world's first tilt-rotor aircraft, made its first flight, and in the same year the McDonnell XV-1 tip-jet autogyro made its record-breaking flight.

With man's desire for aircraft that would use less runway coincident with flying faster, safer and easier handling, he has created many different types of VTOL or SVTOL aircraft including helicopters, autogyros, tilt-rotors, tip-jets, convertiplanes, gyrodynes, contra-rotators and direct lift Harrier types. In terms of best meeting those goals, two types stand out in this field, namely the tilt-rotors and the direct lift Harrier types. The direct lift types have the advantage of speed, but are very expensive to purchase and operate due in part by their need for extreme power during VTOL operations. Present day tilt-rotors are not cheap either, but power requirements for VTOL operations are much more modest. They are very complex, but moderately fast. Their big disadvantages, in a nutshell, are their massive, complex, expensive, inefficient, high maintenance, mechanical drive systems.

As complex as tilt-rotor aircraft are, they are still very much in their infancy. Present day designs make use of mechanical drive systems that cause these aircraft to be expensive, have poor economy of operation and maintenance, a poor empty-weight fraction, poor range, poor performance, and still other factors that will be discussed in more detail below.

The Bell XV-3 followed by the XV-15 were the first to prove the tilt-rotor concept. The Bell-Boeing V-22 Osprey is the result of spending billions and billions of dollars and some 50 years of experimenting with and testing the tilt-rotor concept. With that kind of resources poured into the project, it was made to work.

A search of the literature and the U.S. Patent Office reveal only shaft driven rotors for tilt-rotor aircraft.

The McDonnell XV-1 with its tip-jet driven rotor was one of the first aircraft to really prove the gas-powered tip-jet concept by exceeding contemporary rotor-wing speed records by hitting 200 mph. Tip-jet driven rotary-wing aircraft have the advantages of a powered rotor but need not have a heavy, massive drive train, transmission, clutch, rotor head and blade root sections. Furthermore, in the case of single rotor aircraft, they have no need for an anti-torque device such as a tail rotor. The solution to making these aircraft remarkably fast and efficient aircraft can be found using techniques described herein.

SUMMARY OF THE INVENTION

By utilizing the gas-powered tip-jet driven rotor concept, we transform the tilt-rotor aircraft from a heavy, very complex, very expensive aircraft into an efficient, fast, relatively simple, much less expensive aircraft. Engines can come inboard (perhaps beneath the wing roots), thus saving huge amounts in weight, cost and complexity. In one embodiment, compressed gas from the engines is ducted through each supporting structure or yoke, into the rotor hubs for distribution into the blades and out the tip-jets. Thrust in forward flight is obtained from any combination of thrust from the tip-jet driven rotors and jet exhaust directly from the engines. One engine can easily take over the powering of both rotors with simple valve transfers within the lightweight manifold. Because tip-jet powered rotors are really multiple-flow thrust generators of a superior kind, very large thrust augmentation ratio is achieved.

DETAILED DESCRIPTION OF PREFERRED EMBODIMENT

Figure 1:
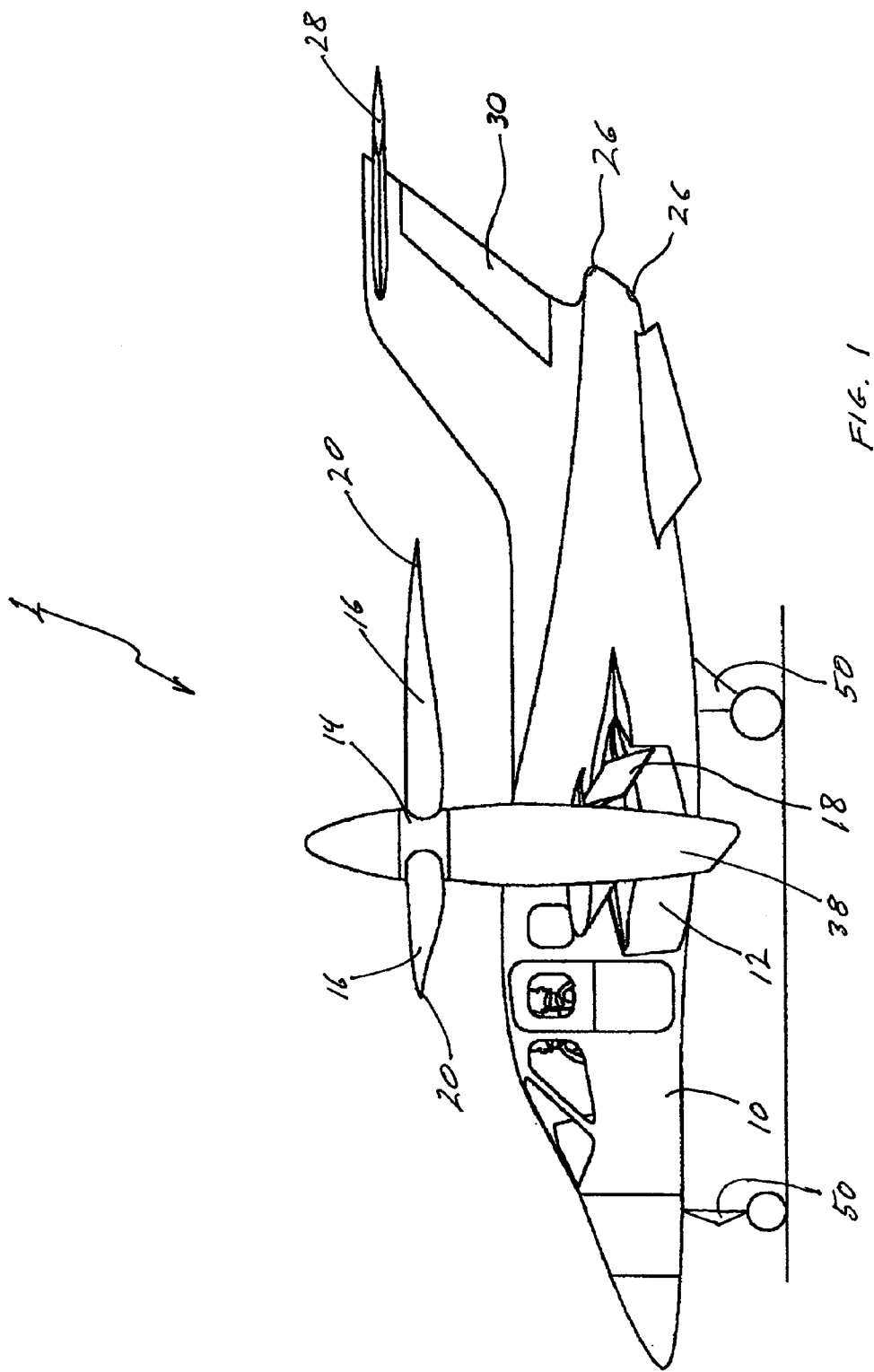
FIG. 1 is a side view of an aircraft constructed in accordance with the preferred embodiment of the present invention shown in VTOL mode.

It is generally understood and defined herein that a compound aircraft is one that has both fixed wings and rotary wings for sustenance of flight. This embodiment of a compound aircraft concerns itself with a particular type of tip-jet driven compound aircraft, and that type is a tilt-rotor tip-jet driven VTOL aircraft. As we shall see momentarily in the drawings, the invention comprises a supporting structure, hub, rotor/propeller (hereinafter called rotor assembly)

and nozzles or tip-jets (as fully described in my first disclosure). The supporting structure for multi-engine aircraft (or yoke for single engine aircraft) is rotated about the pitch axis that is generally coincident with the center of lift and/or the center of gravity in the case of single engine aircraft. The yoke or supporting structure extends up in the vertical position to put the rotor or propeller in the horizontal plane for vertical take-offs and landings, and then is rotated to the horizontal position, which puts the rotor or propeller in the vertical plane for forward propulsion. When the supporting structure is in the horizontal position, it is faired and blends perfectly with it's surrounding surfaces whether they are wings or fuselage surfaces.

Gas, herein defined generally as any fluid with its molecules spaced further apart than that of a liquid, is fed through the supporting structure from a turbine, turbofan, fanjet or an engine driven compressor mounted elsewhere, to the hub, through the blades and out the tip-jets. Tip-jets are generally defined herein as nozzles or orifices or exit apertures located anywhere along the blades (but generally toward the tips) and directed rearward so as to expel sufficient gas at velocities to cause blade rotation about the rotor hub. This makes for a very simple, lightweight, low cost means of providing VTOL capability for a very efficient, relatively high speed, combination jet and propeller driven aircraft.

Tip-jet driven rotors can be termed multiple-flow thrust generators. J. V. Foa in *Elements of Flight Propulsion* (published by Wiley and Sons) defines a multiple-flow thrust generator as "one in which various aggregates of the working fluid undergo different cycles." (He refers here to different thermal cycles.) Examples are: a) turbofans; b) turboprops; c) ducted engines; and d) tip-jet-driven propellers and rotors.

Of all of the various means of applying direct lift to a craft, none can compete with a well-designed multiple-flow thrust generator in terms of efficiency and energy applied versus a desired result. This is due to a little understood fact that this type of thrust generator provides "thrust-augmentation." The above-identified reference defines thrust-augmentation as "an increase in thrust at no extra cost in energy input." He remarks that a jet-driven propeller provides one of the most striking illustrations of thrust-augmentation.

By way of example, a quarter-scale model (rotor diameter of 5.65 feet) of a tip-jet rotor system was built. One test at 6 degrees pitch on each of three blades turning at 2700 rpm produced a thrust-augmentation ratio of 16.8. This means that it would take a mere 13.1 lbs of combined thrust to hover a quarter-scale model aircraft weighing 220 pounds. Using this principle in a tilt-rotor system produces the highly efficient, high performance aircraft described in this embodiment.

The efficiency of this system will attain its maximum by operating the tip-jet driven rotor in its most efficient zone of operation when in VTOL operations. Tests with the quarter-scale model showed that the rotor's most efficient zone of operation is when the tip velocity is around 800 feet per second. The faster the rotor is driven up to the point before the tip enters the sonic transition region, the more efficient the system becomes due to the centrifugal action on the gas mass within the blades. Also, the heavier the load on the rotor system, the higher the operating gas pressure of the system, the denser the gas, the more mass being acted upon by centrifugal force.

Figure 12:
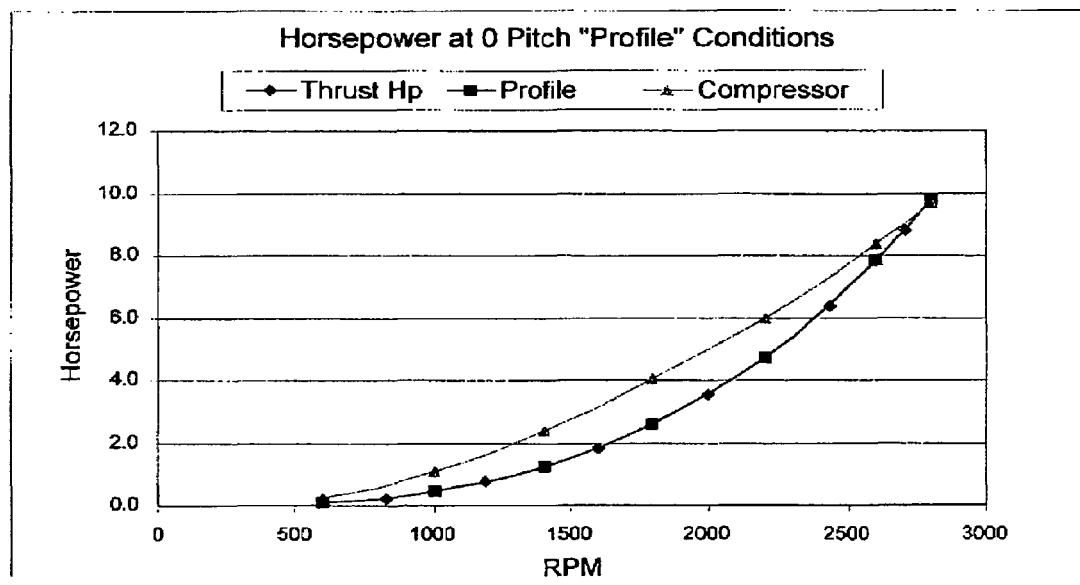
FIG. 12 is a chart illustrating compressor horsepower and thrust horsepower versus rotor rpm when the rotor is at zero-pitch and no-load.

FIG. 12 is a chart that shows the relationship between rotor rpm and various kinds of horsepower at zero-pitch, no-load conditions. Thrust horsepower was calculated from the standard equation: rpm×torque divided by 5250. Profile and compressor horsepower were also calculated using standard equations. Notice that compressor horsepower starts out being less efficient, and then at 2000 rpm, begins increasing in efficiency until it becomes more efficient than the others at 2750 rpm. The rotor rpm of 2750 equates to a tip velocity of 813 fps for this particular rotor.

Figure 13:
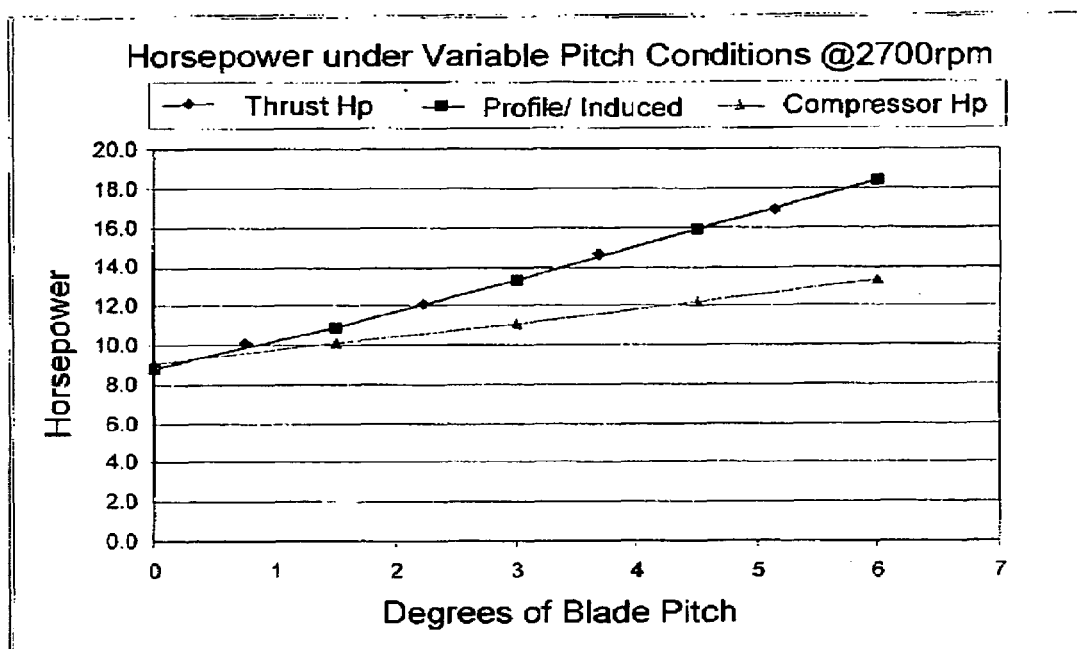
FIG. 13 is a chart illustrating compressor horsepower and thrust horsepower versus rotor blade pitch angle when the rotor rpm is set at 2700 rpm.

FIG. 13 is a chart that shows the relationship between the same three kinds of horsepower (except induced hp is included with profile hp here) versus blade pitch whilst rpm is fixed at 2700 this time. Notice, as pointed out above concerning load, that the larger the pitch, the more efficient the system becomes.

Note that thrust and profile or profile/induced horsepower track each other on both charts of FIGS. 12–13.

The overall object of this invention is to teach a method by which tilt-rotor compound aircraft can be made faster, much lighter, much less costly, much less complex and more efficient than is presently known in the art.

The present invention assembles a number of technologies and methods into a harmonious, synergistic embodiment of a tilt-rotor compound VTOL aircraft. In the preferred embodiment, which has some numerical values used for illustrative purposes only, we have a high performance fuselage including empennage suitable for carrying eight adults. We add to it a small wing that is highly efficient at 300+ mph designed to have a wing loading of around 50 to 60 lbs/sq. ft. We then install two 800 lb thrust fanjet engines with several valves to divert the hot exhaust gases to various nozzles or jets depending upon the need. Now, add two gas-powered tip-jet driven, rigid, three-bladed tilt-rotor assemblies (previously described as multiple-flow thrust generators) that can be tilted about the pitch axis and we have the basic major components that when operated in the manner to be described will yield the superior performing tilt-rotor compound VTOL aircraft described herein.

Problems that here-to-fore were unrecognized or believed to be insoluble are now turned to advantages. For example, it has been a common belief that hovering and VTOL operations consume the most power (out of ground effect, of course), and that the power plant had to be sized for these operations. Combining thrust augmentation with a tilt-rotor aircraft allows us the huge advantage of being able to hover a 7,650 lb. aircraft with a mere 648 lbs. of thrust. This equates to a thrust augmentation ratio of 11.8. And by tweaking the rotor parameters such as rpm and load, we discover an unrecognized problem of heavy drive trains thought to be more efficient than tip-jet driven rotors, and take advantage of tip-jet driven rotors to gain the maximum efficiency between the power plant and the multiple-flow thrust generator(s) as previously described.

It is commonly expected that huge savings in weight and expense could be realized if heavy, expensive, bulky drive train parts could be replaced with tip-jet driven rotors, and it is known that an anti-torque device is not needed, but it is not common knowledge that blade roots can be substantially smaller and lighter because there is almost no torque involved here. The hub for the blades serves mostly as an anchor point for the blade roots. Another unexpected result is that this system becomes more efficient the faster the rotor is turned, and with scimitar tipped blades, it is possible to obtain a maximum effective tip velocity of about Mach 0.85. This is because the rotor acts like a giant centrifugal compressor upon the gas mass inside it. Another unexpected advantage is that this also works to our advantage due to the gas becoming denser as the rotor load increases. Another advantage is that a much smaller fixed wing is required on this craft because the wing is not normally used for takeoffs and landings. Thus, profile drag drops by a large amount, which equates to better efficiency and speed when the aircraft is sustained by the fixed wings. Another element we eliminate in the preferred embodiment is the blade hinge. Because these blades will also serve as propellers, we need rigidity, so we do better without hinges. And to insure minimum gas energy losses we make sure the gas passages and ducting have a uniform cross-section from the source to the various jet nozzles. Combined, these features increase efficiency and speed over prior aircraft.

Finally, if an engine quits, a manifold and valves provide a way to immediately transfer the output of the working engine to both rotor assemblies, as well as both jet exhaust nozzles, if desired. In the extremely unlikely event that an engines-out emergency landing is required, a normal autorotation emergency landing can be made.

Now put yourself into the cockpit of this aircraft. You've completed your flight check, and you are ready to takeoff (or jump-off) from your FAA approved parking lot. Your wing flaps are set at 60 degrees. You push the throttles forward with your right hand. You feed in some pitch and your craft starts to ascend. You maintain stability and control as you lift off with the help of a computer that controls reaction jets for pitch, airflow to the tip-jet rotors for roll, and airflow to jet exhaust nozzles on either side of the fuselage for yaw. You lift the landing gear, and when you are up maybe 50 or 100 feet, depends, you ease forward on your "VTOL"—"Forward Flight" control moving it out of the VTOL detent position. The rotors begin to rotate forward into the propeller position. Your aircraft begins moving forward. You increase forward speed until your wings begin to carry some of the load at around 60 knots. You set your flaps to 30 degrees, and when you have reached 100 knots, you are on the wings. You take in all of your flaps. By this time your rotors have become propellers and more jet gas is going out the jet exhaust nozzles and less to the rotor. Another onboard computer helps you find the best rotor rpm versus rotor pitch versus jet thrust for optimum efficiency. It will change as forward speed and altitude increase. Both computers help to reduce pilot load.

As you settle in at 15,000 feet, you may be surprised that you are now cruising at around 350 knots. You never would have believed performance could be this good in a tip-jet driven tilt-rotor compound VTOL aircraft. Well, with tip-jet driven rotors, you don't need a turboprop engine with all of its attendant gearing and shafting. Nor do you need interlinking drive trains between the two engines when only a lightweight manifold will suffice in the event that one quits—another huge unappreciated advantage!

Description Using Drawings

Figure 2:
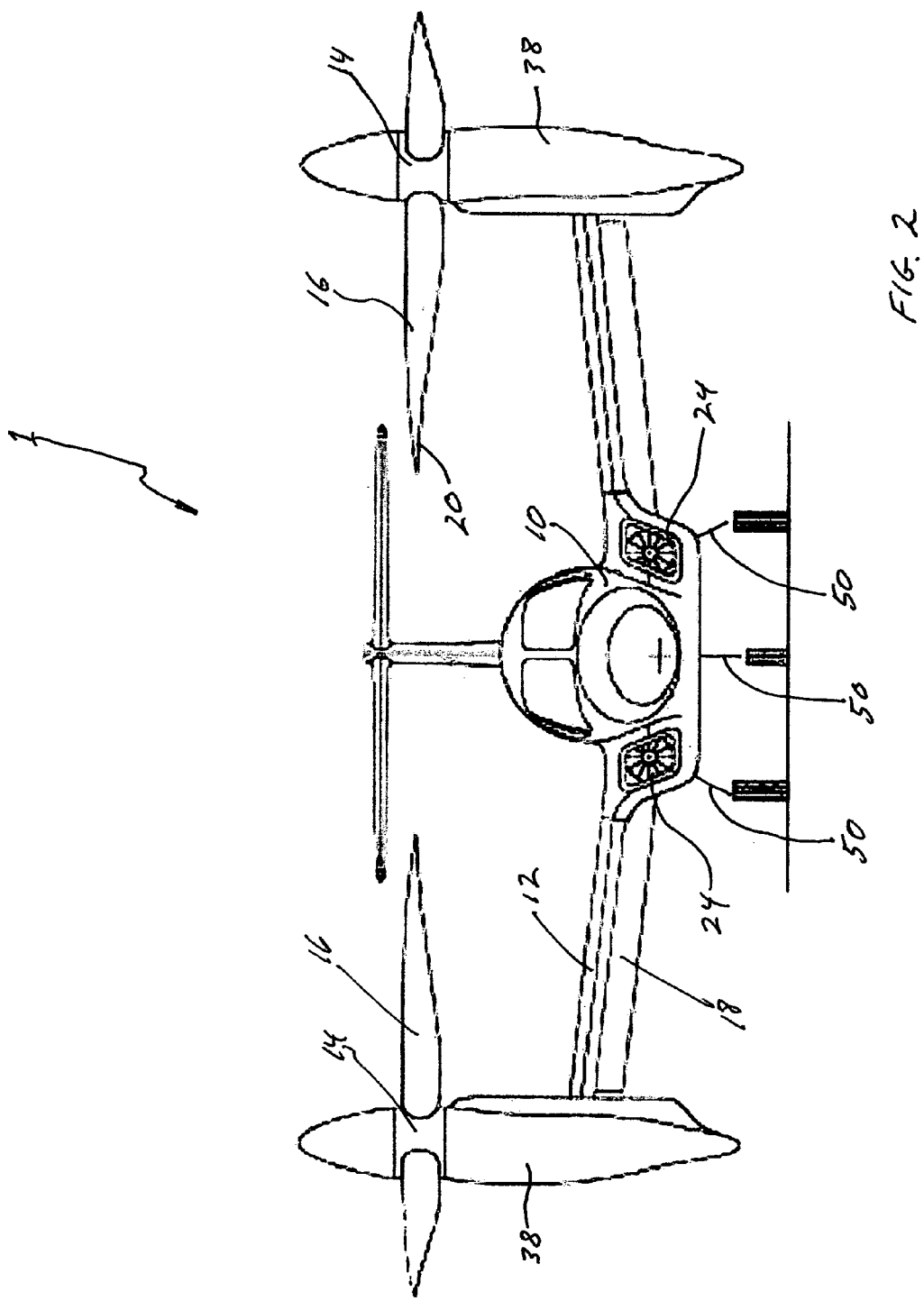
FIG. 2 is a front view of the aircraft of FIG. 1 shown in VTOL mode.
Figure 3:
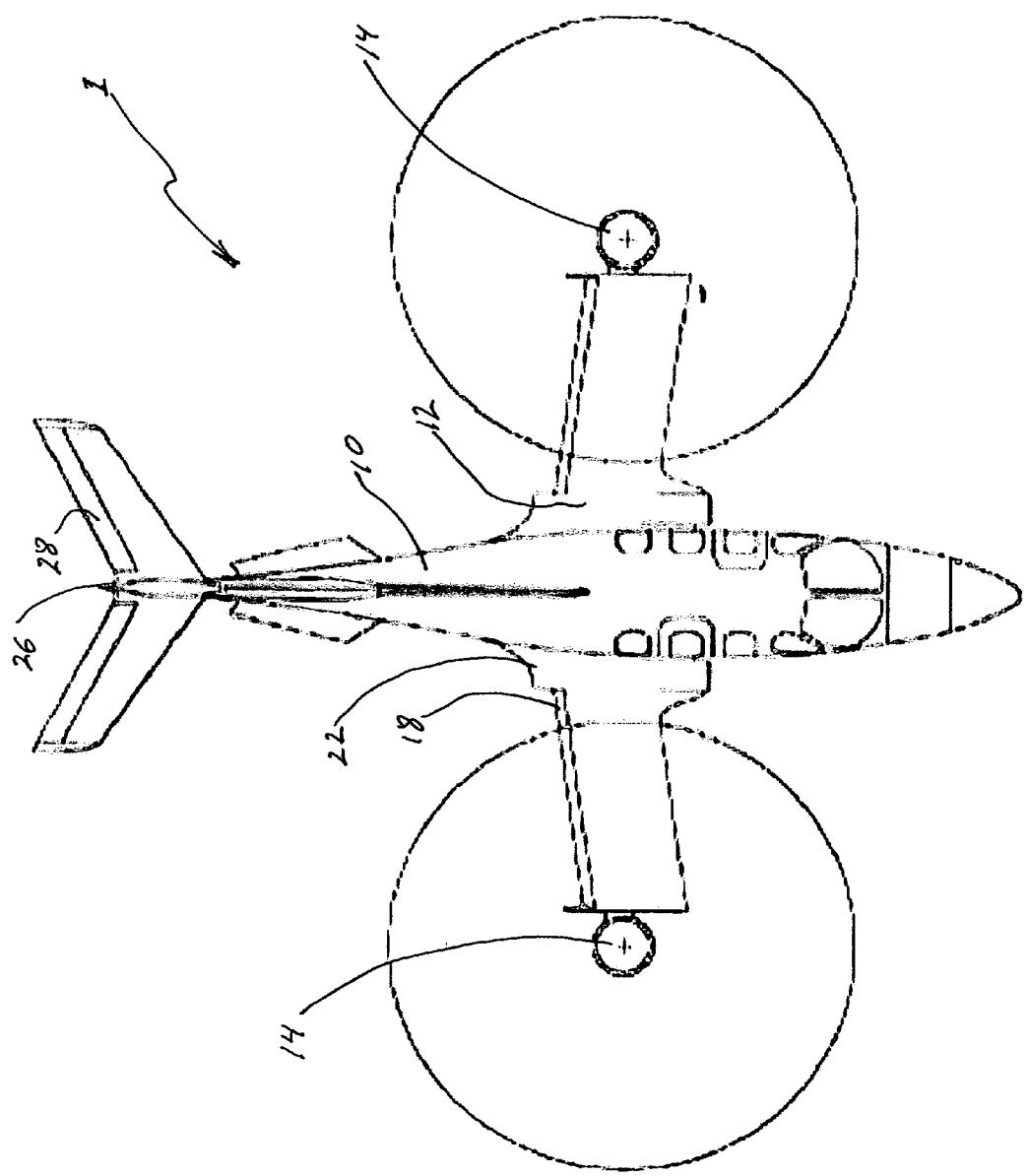
FIG. 3 is a top view of the aircraft of FIG. 1 shown in VTOL mode.
Figure 4:
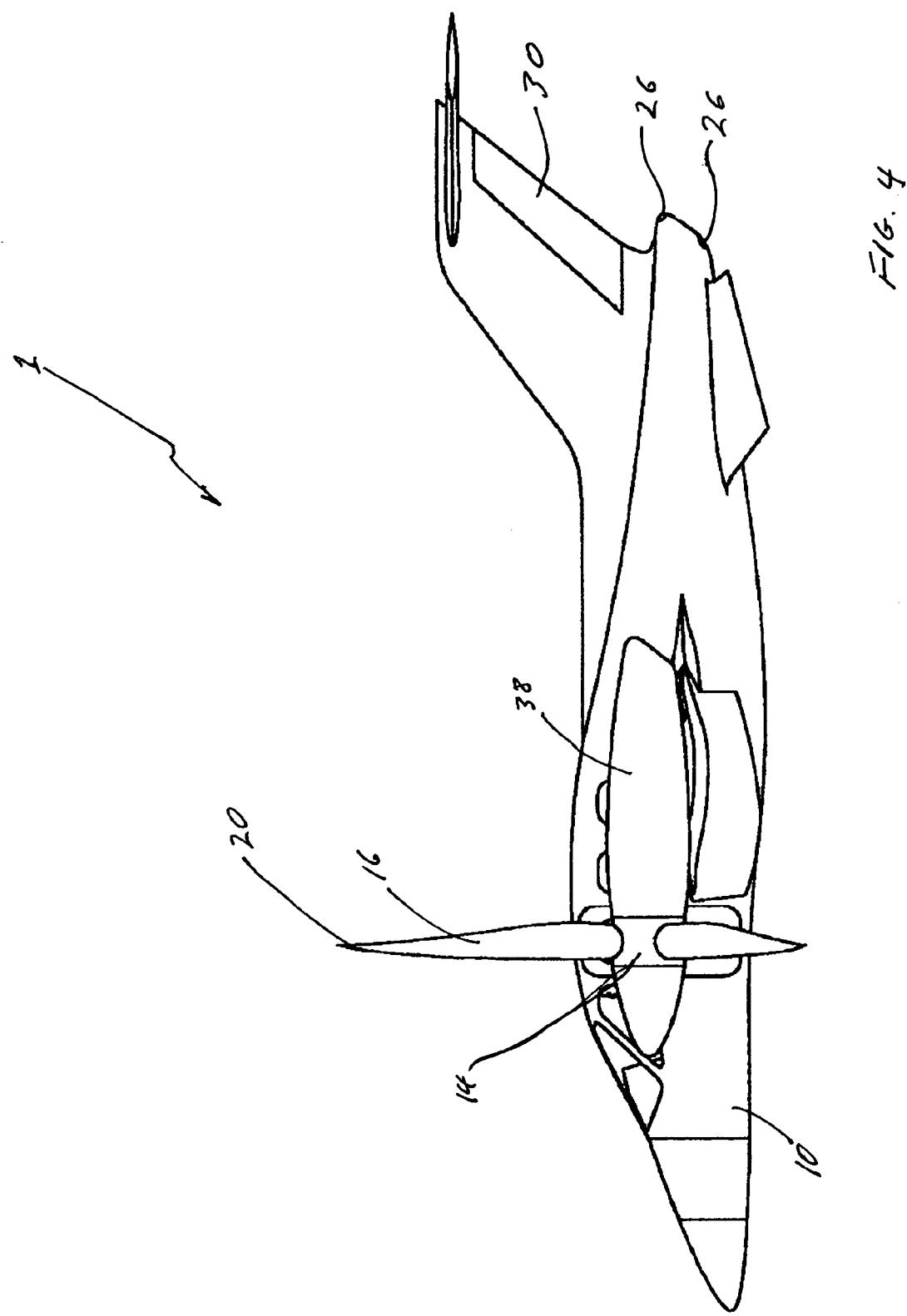
FIG. 4 is a side view of the aircraft of FIG. 1 shown in fixed-wing flight mode.
Figure 5:
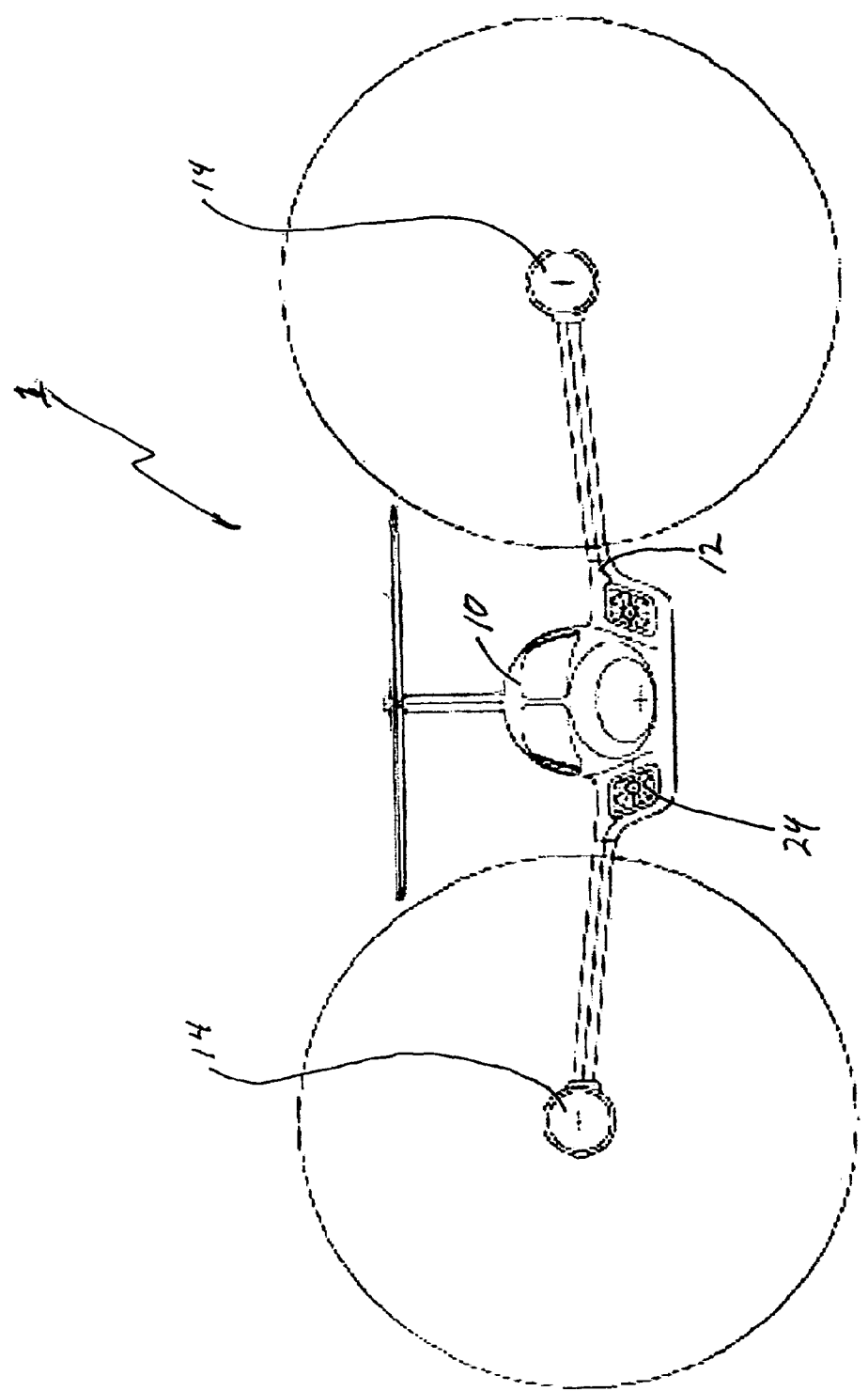
FIG. 5 is a front view of the aircraft of FIG. 1 shown in fixed-wing flight mode.
Figure 6:
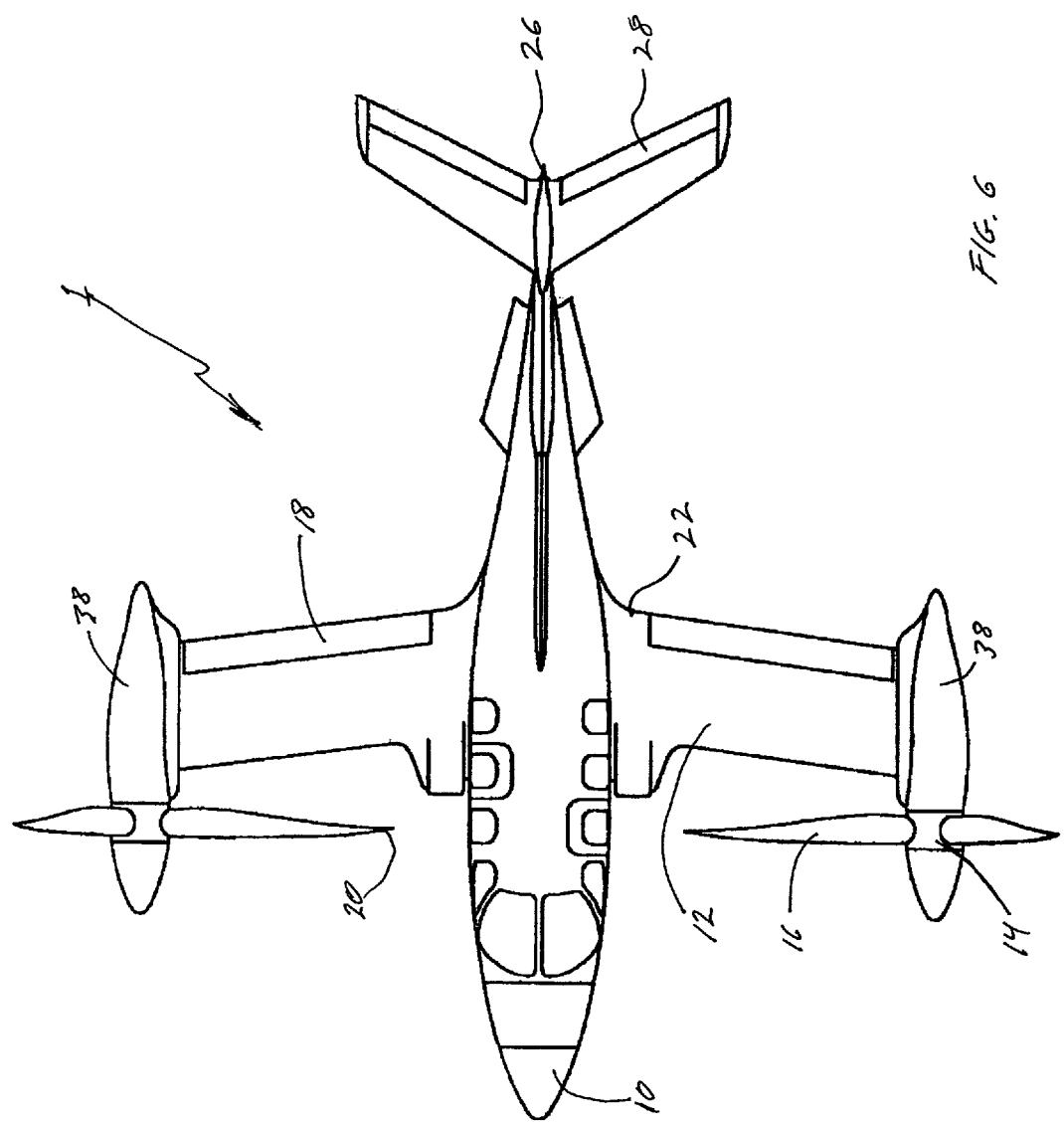
FIG. 6 is a top view of the aircraft of FIG. 1 shown in fixed-wing flight mode.

Referring to the 3-view drawings of the preferred embodiment, FIGS. 1, 2 and 3, and FIGS. 4, 5 and 6, aircraft 1 has an elongated fuselage 10. A forward swept wing 12 extends out equally from the lower portion of both sides of fuselage 10. FIGS. 1, 2 and 3 show wing assembly 12 with a pair of combination flaps and ailerons 18 shown extended. FIGS. 4, 5 and 6 show the same pair of combination flaps and ailerons 18 retracted. Pitch reaction jets 26 are at the extreme tail end of fuselage 10, and are used for pitch control when in the VTOL and transition modes.

Figure 9:
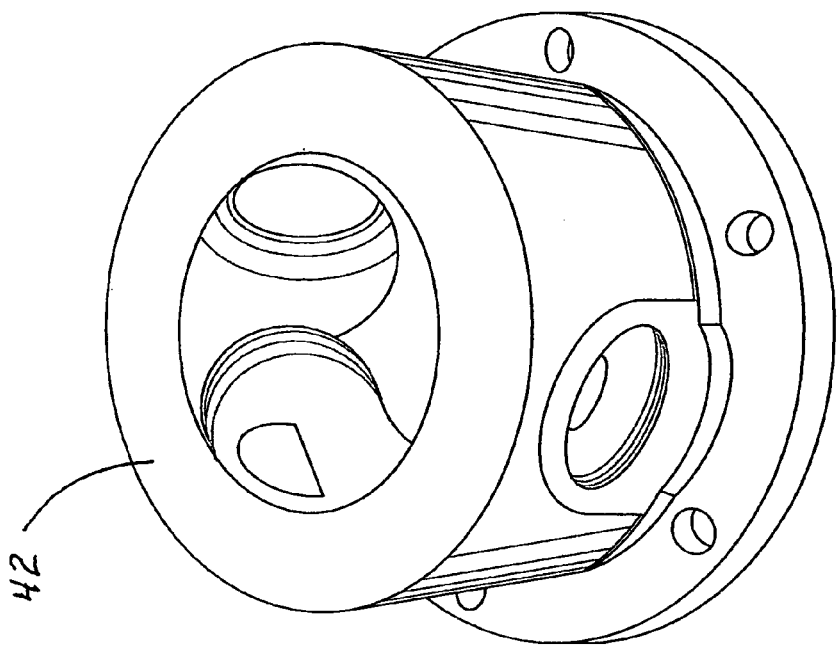
FIG. 9 is an isometric view of the manifold/impeller by itself.

FIGS. 1, 2 and 3 and again in FIGS. 4, 5 and 6, show each half wing of wing assembly 12 has a tiltable rigid rotor assembly 14 (also sometimes called a rotary-wing) shrouded by fairing 38 and attached to the wing tips. FIGS. 1, 2 and 3 show each rotor assembly 14 in the VTOL position, while FIGS. 4, 5 and 6 show them in the fixed-wing flight mode position. Each rotor assembly 14 is driven by compressed gas from fanjet engines 24 shown in the aircraft in FIGS. 2 and 5, and again schematically in FIG. 7, and has a passage through a supporting structure 44 that terminates at manifold/impeller 42 within hub 46, all shown in FIG. 8, and with manifold/impeller 42 shown isometrically by itself in FIG. 9. Blades 16 have an entrance and a path throughout their length that terminates at their tips, each having a nozzle or tip-jet 20. The preferred embodiment of the rotor assembly 14 has three blades 16.

Figure 7:
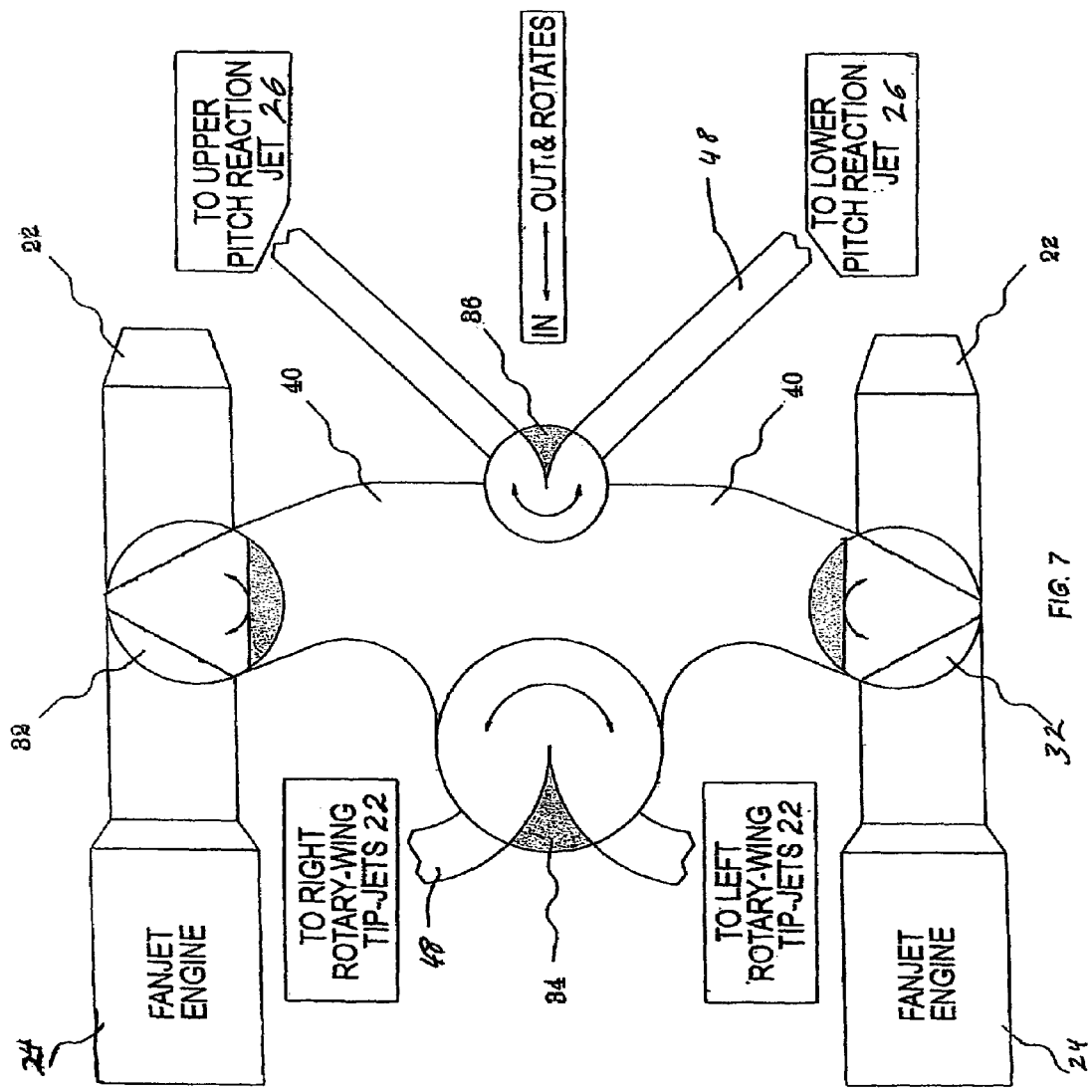
FIG. 7 is a schematic representation of the compressed gas central manifold and valving system of the aircraft of FIG. 1.
Figure 8:
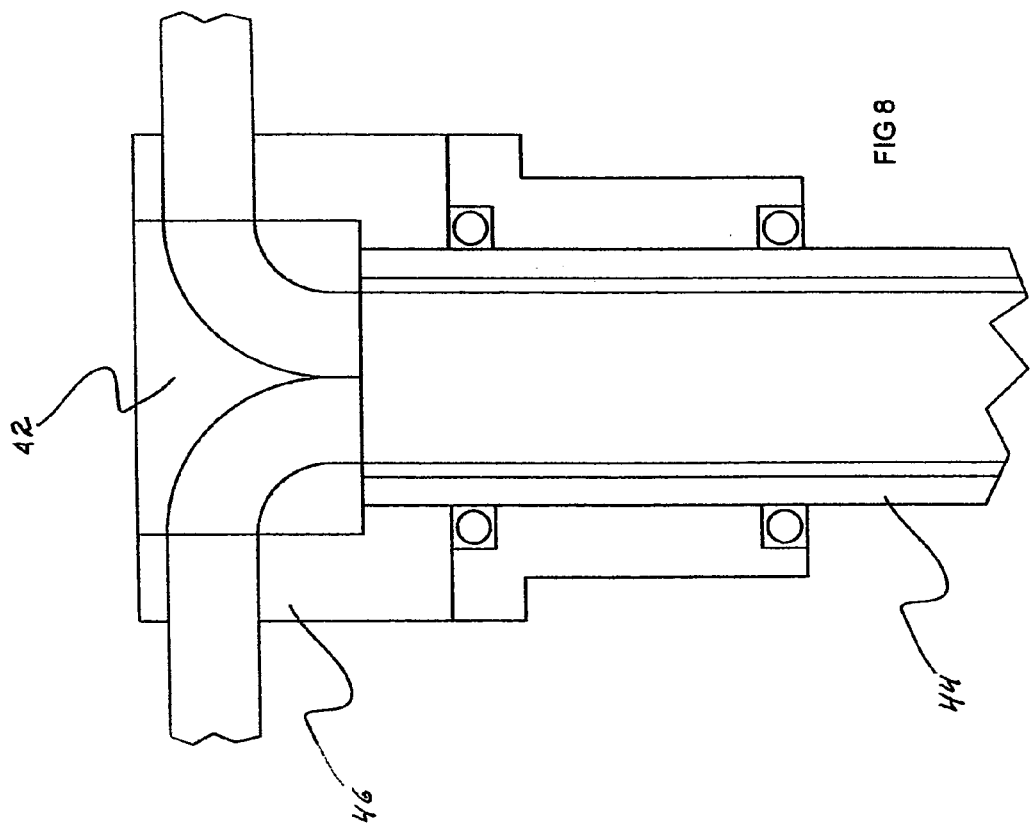
FIG. 8 is a mechanical drawing side view of the manifold/impeller within the rotary-wing hub.

FIG. 7 shows a typical arrangement, schematically, of engines 24 and manifold 40 for exhaust gases, which provide the compressed gas for operation of the rotors 14, the pitch reaction jets 26 and a variable contribution of thrust as determined by overall flight conditions to jet exhaust nozzles 22. Main pitch valve 36 is a double acting valve in that it rotates for varying the mass gas flow between the upper and lower pitch reaction jets 26, and slides in and out for overall volume or mass flow to the pitch reaction jets 26.

Main gas valves 32 at the output of each engine 24 operate in three distinct ways plus provide varying degrees of each. First, they provide a direct path to jet exhaust nozzles 22, and when doing so they shut off the communication path into manifold 40. Second, they can be turned so that all or a variable amount of flow is directed into manifold 40 between engines 24, thus some could flow out jet exhaust nozzles 22 and the remainder would go into manifold 40. Third, main gas valves 32 can be turned to block a dead engine 24 and allow the other engine 24 to provide compressed gas to jet exhaust nozzle 22 aft of the dead engine 24.

A tip-jet adjust valve 34 is used to control the relative gas flow between the two rotors 14. The amount of gas mass flow already being controlled by main gas valves 32, tip-jet adjust valve 34 merely adjusts the relative amount to each rotor assembly 14.

Figure 10:
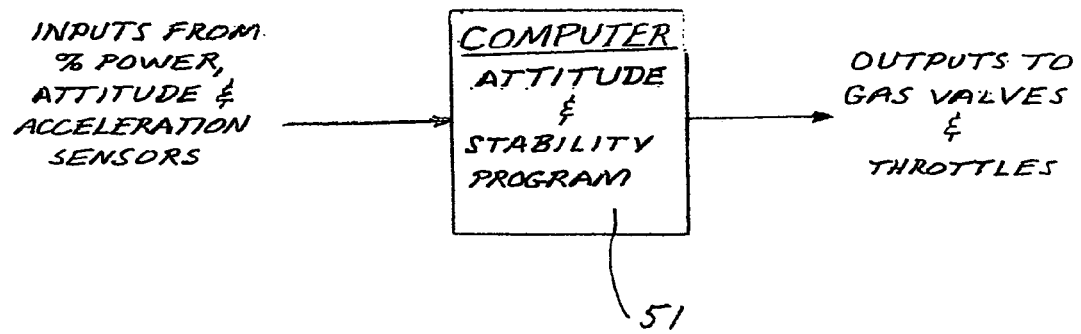
FIG. 10 is a schematic representation of the attitude and stability computer.
Figure 11:
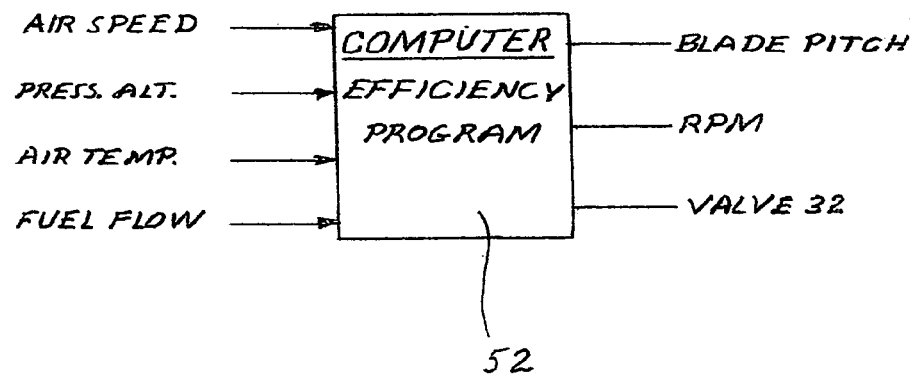
FIG. 11 is a schematic representation of the efficiency computer.

FIG. 10 shows a schematic representation of computer 51, which helps the pilot to managing attitude and stability of aircraft 1. FIG. 11 is a schematic representation of computer 52, which manages aircraft 1 efficiency when in horizontal cruise flight.

Operation

Aircraft 1, being a tilt-rotor compound aircraft, has two modes of flight operation with a blending of the two during transition. Vertical takeoff is accomplished by first configuring aircraft 1 for VTOL operations by fully extending combination flap and ailerons 18, and putting the Mode switch (not shown) in the "VTOL Takeoff" position. The mode switch provides computer 51 input for controlling main gas valves 32 that control thrust from jet exhaust nozzles 22 for yaw control. Computer 51 will also control main pitch valve 36 that provides gas for variable amounts of thrust at either of two pitch reaction jets 26, and takes control of tip-jet adjust valve 34 to provide the means of controlling roll by varying the amount of relative power (gas flow) between the two rotors 14.

Rotor assemblies 14, being already in the vertical position ready for a VTOL lift-off, are awaiting your command. You push forward on the throttles and rotor pitch levers just as you would in a normal twin-engine aircraft. Aircraft 1 becomes airborne as lift from multiple-flow thrust generator rotor assemblies 14 overcomes aircraft 1 weight. You raise landing gear 50, and, if you desire, may take control of roll, pitch and yaw with slight adjustments to a small joystick (not shown) that controls tip-jet adjust valve 34, main pitch valve 36, and main gas valves 32 respectively.

Another control (not shown), operated by the pilot's left hand, is marked "VTOL"—"Forward Flight" and controls the positioning of the tilt-rotors with respect to the aircraft. Before leaving ground effect, the pilot eases this control forward which will simultaneously begin to rotate the two rotor assemblies 14 forward toward their fixed-wing flight, propeller position. Computer 51 maintains aircraft attitude and stability, as it still has control while the aircraft 1 is in the VTOL or transition modes. You pull in your combination flap and ailerons 18 to 30 degrees as you pass through 60 knots.

By the time aircraft 1 has reached 100 knots, it has fully transitioned to forward fixed-wing flight. Rotor assemblies 14 are in their forward and locked position. A light (not shown) on your instrument panel indicates you are through transition so you bring in your combination flap and ailerons 18 and push your Mode switch to "Fixed Wing Flight" position. This takes computer 51 out of control of various valves except for the main gas valves 32, which are now being fed by an efficiency program in computer 52 that controls rotor assembly 14 pitch as well as the relative amount of mass flow between tip-jets 20 and jet exhaust nozzles 22 to provide maximum efficiency and economy during your flight. Inputs to computer 52 for this purpose include ambient temperature, pressure altitude, fuel flow, and forward speed. Like the cruise control in your car, you can override computer 52 at any time.

You control aircraft 1 now just as you would any other twin-engine aircraft. For instance, pushing a quadrant (not shown) forward lowers elevator 28. Pressing the left pedal (not shown) causes rudder 30 to swing left. Turning the quadrant left deflects combination flap and ailerons 18 to provide a left bank.

When the pilot has eased the throttle and slowed aircraft 1 to about 120 knots in preparation for a VTOL landing, he will put the mode switch into the "VTOL Landing" position. He will continue slowing aircraft 1 and extend combination flap and ailerons 18 to 30 degrees at 100 knots. He drops landing gear 50. He now begins to slowly come back on the "VTOL"—"Forward Flight" control into the VTOL position. This control rotates rotor assemblies 14 about the aircraft's pitch axis. When he reaches his desired rate of descent, he will maintain it by adjusting rotor assembly 14 pitch with his rotor pitch control levers. Valve 36 for pitch reaction jets 26 is controlled by computer 51 once again to maintain attitude and stability about the pitch axis. Main gas valves 32 control thrust from jet exhaust nozzles 22 for yaw control, and tip-jet adjust valve 34 provides the means of controlling roll by varying the amount of relative power (gas flow) between the two rotor assemblies 14.

Below 60 knots, aircraft 1 is fully in the VTOL mode. The pilot may take control from computer 51 at any time by making adjustments via the small joystick that controls tip-jet adjust valve 34, main pitch valve 36, and main gas valves 32. As aircraft 1 is slowed to approximately 25 knots the pilot fully extends combination flap and ailerons 18 to 60 degrees. When aircraft 1 is within ground effect, the pilot eases rotor assembly 14 pitch and throttle controls to complete his vertical landing. Once he is back on the ground, he can taxi by rotating main gas valves 32 to the straight through position and providing some thrust with throttles. When main gas valves 32 are rotated to this position, all compressed gas power is blocked from going to rotor assemblies 14 and they freewheel to a stop.

CONCLUSION, RAMIFICATIONS, AND SCOPE

There has been a long felt need to have a VTOL aircraft that can fly over 300 knots. This has only been achieved so far by the military's V-22 Osprey and the AV-8 Harrier. When aircraft cost versus useful load or operating costs versus useful load are considered, neither can meet the high standards of this preferred embodiment, which will fly well over 300 knots. All tilt-rotor aircraft still use shaft driven rotors. None have shown an assembling of properly designed elements to accomplish what the present invention accomplishes.

To summarize, we use tiltable, multiple-flow thrust generators comprised of gas-powered tip-jet driven rotors for the rotor assemblies. These multiple-flow thrust generators often obtain an augmentation ratio of greater than 10, and they provide the lift when in the VTOL or transition modes. When in the fixed-wing flight mode, they may provide the thrust for forward flight, or jet exhaust may provide the thrust, or there may be a combination of the two. The rotors have collective pitch control but no cyclic control. The blade root sections are small and lightweight compared to shaft driven counterparts.

The preferred embodiment uses a medium to high aspect ratio, medium to highly loaded fixed-wing to sustain the aircraft during the higher speeds of forward flight.

A computer helps maintain attitude about the pitch axis with reaction jets in VTOL and transition modes. Varying the thrust between the two jet exhaust nozzles controls yaw, and varying the gas power to the two rotor assemblies controls roll. This is all combined with uniform cross-section ducting, necessary gas valves, other necessary control surfaces, and a manifold/impeller in each rotor hub for efficient transition of gas flow into the blades. Other operational functions include operating the rotors at high rpm and loads for better efficiency when in VTOL and transitional modes, using flaps on the fixed-wing to reduce wing print under the rotors and help to achieve transition at a lower forward speed. We can optionally use dump and capture valves as a means of controlling temperature, pressure and volume of the compressed gases.

The preferred embodiment of this tilt-rotor aircraft has a number of unforeseen advantages, which include:
1. economy of operation,
2. economy of maintenance,
3. large reduction in weight,
4. large reduction in initial cost,
5. increased payload,
6. increased range,
7. increased performance,
8. built in rotor/propeller de-icing capability,
9. no shafting, clutches or transmissions required to couple two power-plants/rotors together for emergency engine out conditions,
10. gains in efficiency result as rotor load and rpm increase,
11. does not require a large, heavy blade root section to carry the load from the shaft as in shaft driven rotors,
12. better aerodynamic designs, (The aircraft can be designed from a purely aerodynamic and cg/balance point of view. There need be no consideration given to locating the engine(s) with respect to the drive train or rotors.)
13. a huge thrust augmentation ratio,
14. no need for an anti-torque device such as a tail rotor on a helicopter,
15. permits driving more than one device (rotor and/or propeller) with one engine simply by ducting gas to the device's locations, 16. eliminates the need for engine nacelles and their extra drag when it is desired to place propellers out on the wings,
17. permits the use of a very small wing (high wing loading) because the wing is only used totally by itself for lift when the rotor/propellers are fully forward in the fixed-wing flight mode. (This occurs at speeds upward of 100 mph, and will dramatically increase aircraft performance above this speed due to much lower wing profile drag.)

It is the object of the present invention to provide a gas-powered tip-jet-driven tilt-rotor compound VTOL aircraft that will bring about the realization of each and every one of the seventeen enumerated benefits listed above.

While the above description contains many specificities, these should not be construed as limitations on the scope of the invention, but rather as an exemplification of one preferred embodiment thereof. Many other variations are possible. For example, any fixed wing that will sustain the aircraft is suitable. There are various engine options that can be used, such as pure turbine engines or reciprocating engines combined with a blower or compressor, or two engines of the same or different types could be used rather than providing the main gas valve of my preferred embodiment. Forward flight propulsion can be any combination of propeller and jet exhaust. VTOL attitude control could also be by other means, such as extra control surfaces for use during slow speed maneuvers, or small fans at points on the aircraft that would adequately control attitude around the yaw, pitch and roll axes; or even a combination of various means could be used. Two, three or even four blades could be used for the tilt-rotor assemblies, and they could be of the flex-beam-rotor type depicted in U.S. Pat. No. 6,024,325, which can be used for collective pitch control. The three-position mode switch, whose functions were addressed in the "operations" part of the "detailed description of preferred embodiment" section, may be replaced by computer logic. And, finally, it might be advantageous to stop the rotors completely and feather them during fixed-wing flight. These are all ramifications of the present invention that I claim.

Accordingly, the scope of the invention should be determined not by the embodiment illustrated, but by the appended claims and their legal equivalents.

I claim:

1. According to the present invention, there is provided a gas-powered tip-jet-driven tilt-rotor compound aircraft, in hereinafter known as said aircraft, comprising:
   a.) a fuselage;
   b.) a fixed wing having an outer portion and a central portion with the central portion fixed to said fuselage resulting in two half-wings projecting to either sided from said fuselage;
   c.) one or more engines with means for providing compressed gases to a manifold equipped with valves for the control and distribution of said gases to:
      1.) one or more multiple-flow thrust generators comprising:
         (a) a rotor carried by a supporting structure with means for changing the orientation of said rotor between a first mode wherein the plane of rotation of said rotor is in a first position for vertical and hover operations, and a second mode wherein the plane of rotation of said rotor is in a second position for horizontal flight operations;
         (b) said rotor having a plurality of blades, each having a tip, a root and a trailing edge, said root being rigidly fixed to a hub wherein said blades are permitted to rotate about their span axis for collective pitch control, wherein said rotor contains an entrance and a path for compressed gases to flow from said supporting structure in communication with said manifold to a tip-jet on each of said blades;
         (c) a jet exhaust with means for propelling said aircraft in horizontal flight.

2. An aircraft as described in claim 1 wherein the main means of propelling said aircraft during fixed-wing flight is by any combination of jet exhaust from said engine(s) through a jet exhaust nozzle(s) and thrust from the multiple-flow thrust generator(s), and, further including a main gas valve(s) to control and modulate the compressed gas flow from said engine(s) to said multiple-flow thrust generator(s) and said jet exhaust nozzle(s) for forward propulsion.

3. An aircraft as described in claim 1 wherein said multiple-flow thrust generators are carried by said supporting structures that are affixed to said outer portions of said half-wings with means for changing the position of said rotor between VTOL mode wherein the plane of rotation of said rotor is substantially horizontal, and a fixed-wing flight mode wherein the plane of rotation of said rotor is substantially vertical.

4. An aircraft as described in claim 1 further comprising computer controlled reaction jets that augment other means for controlling said aircraft attitude during VTOL and transition flight on various yaw, pitch or roll axes.

5. An aircraft as described in claim 1, wherein said valves and manifold are configured for a dead engine emergency so that compressed gases from the good engine are redirected to the multiple-flow thrust generator and jet exhaust nozzle on the dead engine side as required.

6. An aircraft as described in claim 1, wherein said multiple-flow thrust generator has an augmentation ratio of at least 2.

7. An aircraft as described in claim 1 wherein the portion of said ducting in the fixed wing and said ducting within said rotary-wing blades may provide de-icing capability for said fixed wing and rotary-wing.

8. An aircraft as described in claim 1 wherein said blade tips are scimitar shaped so as to achieve a lower effective Mach number.

9. An aircraft as described in claim 1 further including a manifold/impeller(s) within said hub(s) comprising an impeller that includes spiraled blades that form into cross-sectional paths the size of each blade entrance, thus providing an impelling force, smooth flow and transition of the gas into said blades.

10. An aircraft as described in claim 1 further including leading edge and trailing edge flaps affixed to each of said half-wings provide a means of:
   a.) removing some of the wing foot-print area directly under said rotor(s), and
   b.) effecting transition to fixed-wing flight at a lower flight speeds.

11. An aircraft as described in claim 1 further including a means for using a computer to control rotor blade pitch and rotor rpm settings.

12. An aircraft as described in claim 1 further including a computer means to control various systems for easing pilot load.

* * * * *